US010569678B2

(12) United States Patent
Zouzal et al.

(10) Patent No.: US 10,569,678 B2
(45) Date of Patent: *Feb. 25, 2020

(54) THORACIC AIR BLADDER ASSEMBLY

(71) Applicants: Lear Corporation, Southfield, MI (US); Winsen C. Zouzal, Detroit, MI (US)

(72) Inventors: Winsen C. Zouzal, Detroit, MI (US); Gerald Patrick, Shelby Township, MI (US); Ashford Allen Galbreath, Troy, MI (US); Michelle A. Pereny, Farmington Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,356

(22) Filed: May 23, 2018

(65) Prior Publication Data

US 2018/0264981 A1 Sep. 20, 2018

Related U.S. Application Data

(63) Continuation of application No. 14/599,650, filed on Jan. 19, 2015, now Pat. No. 9,981,577.

(51) Int. Cl.
*A47C 7/40* (2006.01)
*B60N 2/52* (2006.01)
(Continued)

(52) U.S. Cl.
CPC ............... *B60N 2/525* (2013.01); *A47C 4/54* (2013.01); *A47C 7/40* (2013.01); *A47C 7/467* (2013.01); *B60N 2/646* (2013.01); *A47C 7/46* (2013.01)

(58) Field of Classification Search
CPC ........... B60N 2/525; A47C 4/54; A47C 7/467; A47C 7/40; A47C 7/46
(Continued)

(56) References Cited

U.S. PATENT DOCUMENTS 3,348,800 A * 10/1967 Wiechers ............... A47G 23/03
215/394
3,348,880 A 10/1967 Swann
(Continued)

FOREIGN PATENT DOCUMENTS

CN 1087804 A 6/1994
CN 101374695 A 2/2009
(Continued)

OTHER PUBLICATIONS

Chinese Office Action for Application No. 20160027428.4, dated Aug. 6, 2017, 7 pages.

*Primary Examiner* — Syed A Islam
(74) *Attorney, Agent, or Firm* — Brooks Kushman P.C.

(57) ABSTRACT

A seat air bladder assembly is provided with at least one central air bladder region having a support surface. At least one pair of lateral air bladder regions extend from opposed sides of the at least one central bladder region. The at least one pair of lateral air bladder regions are oriented at a non-zero angle to incline laterally and support a thoracic region of a seat occupant. A seat assembly is provided with a seat back with a contact surface with a thoracic region. An air bladder assembly is oriented within the thoracic region of the seat back with a support surface that is reclined relative to the contact surface to provide support, and wedge-shaped so that during inflation the air bladder assembly inflates in an upward and forward direction relative to the seat back.

16 Claims, 2 Drawing Sheets

(51) Int. Cl.
*A47C 4/54* (2006.01)
*B60N 2/64* (2006.01)
*A47C 7/46* (2006.01)

(58) Field of Classification Search
USPC .............. 297/284.3, 284.6, 452.34, 452.41
See application file for complete search history.

(56) References Cited

U.S. PATENT DOCUMENTS

| | | | |
|---|---|---|---|
| 5,029,928 | A | 7/1991 | Huber |
| 5,967,608 | A | 10/1999 | Van Sickle |
| 6,088,642 | A | 7/2000 | Finkelstein et al. |
| 6,088,643 | A | 7/2000 | Long et al. |
| 6,129,419 | A | 10/2000 | Neale |
| 6,203,105 | B1 | 3/2001 | Rhodes, Jr. |
| 6,273,810 | B1 | 8/2001 | Rhodes, Jr. et al. |
| 6,578,916 | B2 | 6/2003 | Longhi et al. |
| 6,659,552 | B2 * | 12/2003 | Duncan .................. B60N 2/643 297/230.1 |
| 6,682,059 | B1 | 1/2004 | Daniels et al. |
| 7,152,920 | B2 | 12/2006 | Sugiyama et al. |
| 7,967,379 | B2 | 6/2011 | Walters et al. |
| 8,616,654 | B2 | 12/2013 | Zenk et al. |
| 9,381,840 | B2 | 7/2016 | Tobata et al. |
| 9,981,577 | B2 * | 5/2018 | Zouzal .................. B60N 2/914 |
| 2002/0056709 | A1 | 5/2002 | Burt |
| 2002/0096915 | A1 | 7/2002 | Haupt et al. |
| 2006/0290175 | A1 | 12/2006 | Hartwich |
| 2008/0277985 | A1 | 11/2008 | Petzel |
| 2010/0244504 | A1 | 9/2010 | Colja et al. |
| 2013/0166078 | A1 | 6/2013 | Heger et al. |
| 2014/0167463 | A1 | 6/2014 | Sakata et al. |
| 2018/0118060 | A1 | 5/2018 | Zouzal et al. |

FOREIGN PATENT DOCUMENTS

| | | |
|---|---|---|
| CN | 201329822 Y | 10/2009 |
| CN | 201646470 U | 11/2010 |
| CN | 101992708 A | 3/2011 |
| CN | 102015362 A | 4/2011 |
| CN | 102099227 A | 6/2011 |
| CN | 104044495 A | 9/2014 |
| DE | 10331624 B3 | 4/2005 |
| DE | 102005034069 A1 | 1/2007 |
| DE | 102006036532 A1 | 2/2008 |
| FR | 2988051 A1 | 9/2013 |
| WO | 2012159688 A1 | 11/2012 |
| WO | 2014031819 A1 | 2/2014 |
| WO | 2014031820 A1 | 2/2014 |
| WO | 2014066493 A2 | 5/2014 |

* cited by examiner

THORACIC AIR BLADDER ASSEMBLY

CROSS-REFERENCE TO RELATED APPLICATIONS

This application is a continuation of U.S. application Ser. No. 14/599,650 filed Jan. 19, 2015, now U.S. Pat. No. 9,981,577 B2, the disclosure of which is hereby incorporated in its entirety by reference herein.

TECHNICAL FIELD

Various embodiments are directed to an air bladder assembly for a thoracic region of a seat back.

BACKGROUND

In a seated position, a thoracic region of a person's spine supports much of the person's upper body mass.

SUMMARY

According to an embodiment, an air bladder assembly for a seat is provided with at least one central longitudinal air bladder region having a support surface. At least one pair of lateral air bladder regions extend from opposed sides of the at least one central bladder region. The at least one pair of lateral air bladder regions are oriented at a non-zero angle and incline laterally to support the thoracic region of a seated occupant.

According to another embodiment, a seat assembly is provided with a seat back and an air bladder assembly oriented within a thoracic region of the seat back. The air bladder assembly is provided with at least one central air bladder region having a support surface. At least one pair of lateral air bladder regions extend from opposed sides of the at least one central bladder region. The at least one pair of lateral air bladder regions are oriented at a non-zero angle relative to one another about an axis generally perpendicular to the support surface of the at least one central air bladder region to support a thoracic region of a seat occupant.

According to another embodiment, a seat assembly is provided with a seat back with a contact surface with a thoracic region. An air bladder assembly is oriented within the thoracic region of the seat back with a support surface that is reclined relative to the contact surface to provide support, and wedge-shaped so that during inflation the air bladder assembly inflates in an upward and forward direction relative to the seat back.

DETAILED DESCRIPTION

Figure 2:
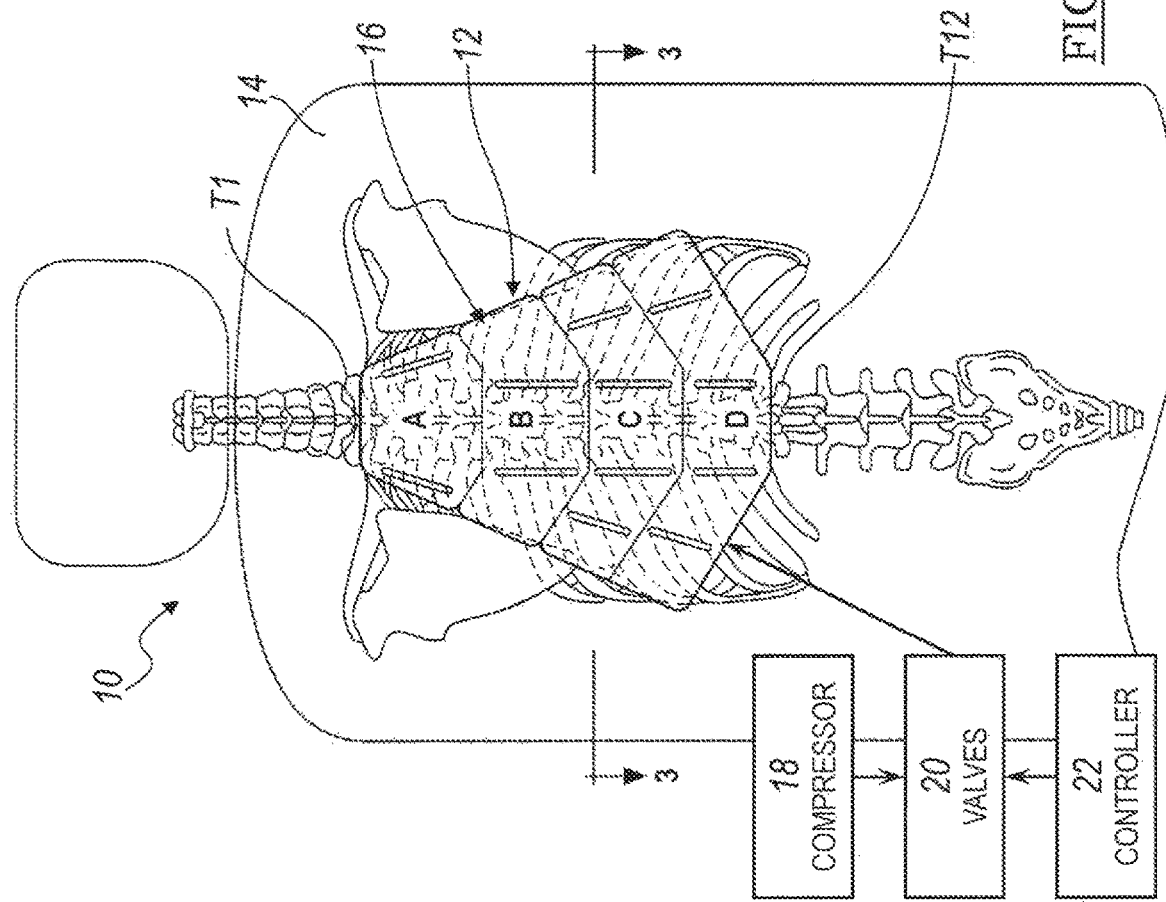
FIG. 2 is a rear schematic view of the seat assembly of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this invention. Practice within the numerical limits stated is generally preferred. Also, unless expressly stated to the contrary, the description of a group or class of materials by suitable or preferred for a given purpose in connection with the invention implies that mixtures of any two or more members of the group or class may be equally suitable or preferred.

It is believed that supporting the thoracic region of the spine can reduce forces and support as much as one-third of the upper body mass. By increasing support of the upper body mass, loads are reduced on the muscles, vertebrae, and discs through the spine and pelvic regions. Decreased load reduces fatigue on these areas of the body. The current prevalent comfort back supporting technology for the furniture and transportation market focuses on the lumbar (lower) region of the back to provide relief from fatigue. With the change from a primarily labor intensive work force to one of computer-using desk workers, we see an increase in low back pain. This is driving the need for an improvement in the location of the seating support system designed to prevent fatigue and the resultant discomfort. By transferring support from solely located in the lumbar region to now include the thoracic region of the spine, load is transferred to a more rigid section of the spinal column as well and a decrease in lower back pain should result.

A comfort seating system for office or home seating furniture or comfort vehicular seating systems, such as in automotive, train, off-road vehicular or aircraft seating, provides supporting pressure along the thoracic region of the user's spine between the T1 to the T12 vertebrae, and lesser support in the lumbar region. The region above the T1 vertebrae is the cervical region; and the regions below the T12 vertebrae are the lumbar, sacral and coccyx regions.

The support structure is to be positioned along the thoracic region of a seat back when the user is seated. The support structure can be used in a variety of seating systems. Some exemplary seating systems and components are shown and described below.

There are four main factors that affect subjective comfort: 1) smoothness of the pressure integral; 2) sufficiency of the pressure change; 3) ability to create even pressure for a wide range of anthropometry; and 4) ergonomic/control suitability of actuation.

A thoracic region comfort seating system design is focused on addressing subjective comfort factors. By supporting the thoracic region, the user's load is transferred from the lumbar region to the thoracic region, reducing stress and fatigue in the muscles, tendons, and vertebrae.

A design feature permits even pressure for a wide range of anthropometry, which can be accommodated by having the degree of pressure adjustable.

Figure 1:
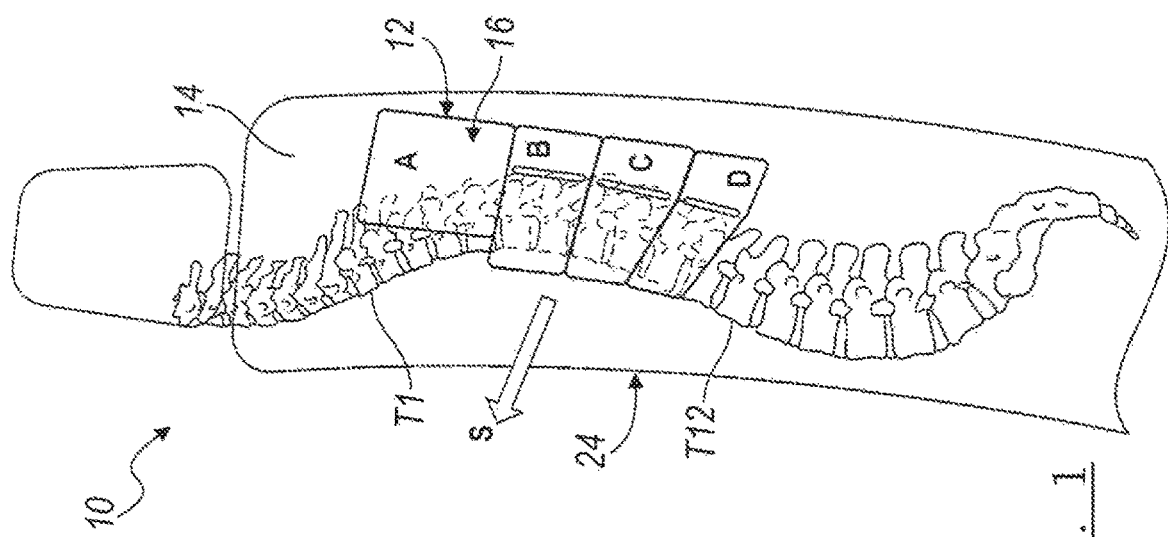
FIG. 1 is a side schematic view of a seat assembly according to an embodiment.

Referring now to FIGS. 1 and 2, a seat assembly is illustrated and referenced generally by numeral 10. The seat assembly 10 may be a vehicle seat such as for an automobile or an aircraft, an office chair, a comfort chair or any seat assembly that can benefit by an adjustable posture system. The seat assembly 10 is illustrated with an array of bladders that can be each adjustable and individually or collectively inflated providing support at various locations in the seat intended to accommodate different sized and statured individual occupants, as a thoracic support system, which is referenced generally by numeral 12.

Figure 5:
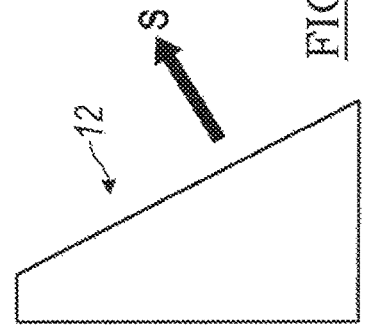
FIG. 5 is an alternative side schematic view of the seat assembly of FIG. 1.

According to one embodiment, the thoracic support system is a power pneumatic system in a seat back 14 which provides support to thoracic vertebrae (FIGS. 1 and 2) and a posterior rib cage (FIGS. 2 and 3) between the shoulder blades (FIG. 2) to support an occupant to achieve a proper neutral seating posture. The support system 12 may be shaped in a wedge configuration as depicted in FIG. 5, to provide support in a forward and upwards direction (arrow S in FIGS. 1 and 5) to the thoracic region from thoracic vertebra T1 to thoracic vertebra T12 (FIGS. 1, 2, and 5) while the occupant is seated in a standard seating or driving position. The support system is provided with a plurality of support zones labeled A-D in FIGS. 1 and 2. The support zones A, B, C, D are individually adjustable to achieve an optimum support condition for a variety of postures and occupant sizes.

The support system 12 includes an air bladder assembly 16 that provides the zones A, B, C, D. The support system 12 includes a compressor 18 for providing a source of pressurized air to valves 20. The valves 20 are controlled by a controller 22. The valves 20 are in fluid communication with the zones A, B, C, D for controlling pressure and inflation of the zones A, B, C, D. The controller 22 may operate as described in Henn et al. U.S. patent application 62/009,585, filed on Jun. 9, 2014, which is incorporated in its entirety be reference herein. The controller 22 permits individual adjustment of pressure of each of the zones A, B, C, D as specified by an occupant selection or a predetermined pressure setting.

The air bladder assembly 16 is mounted to a suspension, such as a wire mat, that is connected to a frame of the seat back 14. Although not illustrated, seat frames and suspensions are well known in the art.

Figure 3:
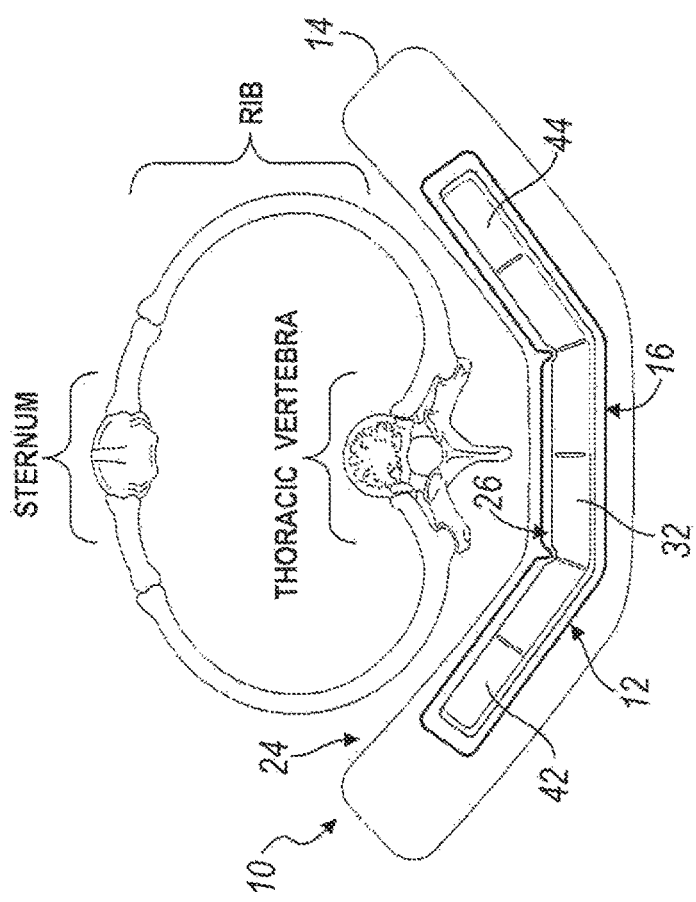
FIG. 3 is a cross section view of the seat assembly of FIG. 1.

The air bladder assembly 16 is oriented in a thoracic region of an occupant's back. In other words, the air bladder assembly 16 is sized to be located between the shoulder blades and between the T1 and T12 vertebrae for an average occupant. The seat back 14 has a contact surface 24 as depicted in FIG. 1. FIG. 3 illustrates a section view of the seat back 14 through the section line in FIG. 2. The air bladder assembly 16 is provided with a plurality of support surfaces 26 (FIG. 3) within the seat back 14. The support surfaces 26 of the air bladder assembly 16 are reclined relative to the contact surface 24 of the seat back 14 so that inflation of the zones A, B, C, D provides support in the upward and forward direction S in FIGS. 1 and 5.

Figure 4:
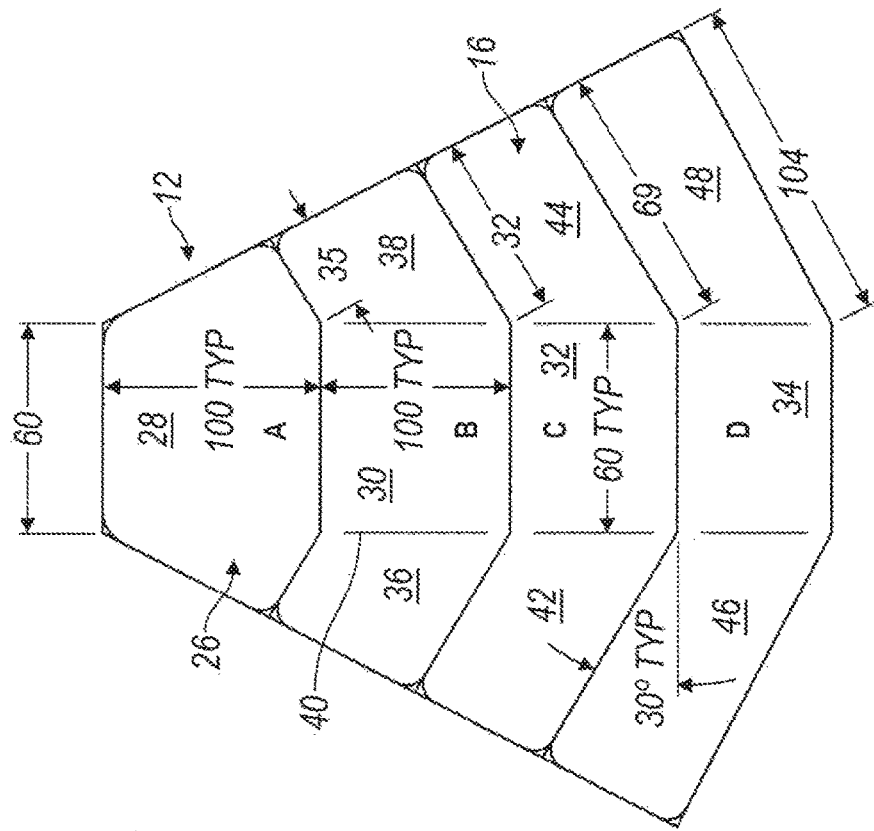
FIG. 4 is a front elevation view of an air bag assembly of the seat assembly of FIG. 1.

The air bladder assembly 16 is also illustrated removed from the seat back 14 in FIG. 4. The air bladder assembly 16 includes an upright column of central air bladder regions 28, 30, 32, 34, each within one of the zones A, B, C, D for supporting the thoracic vertebrae as depicted in FIGS. 1-3. The upright column of central air bladder regions 28, 30, 32, 34 are arranged longitudinally within the seat back 14, or generally up and down along the seat back 14 in this environment. Referring again to FIG. 4, the first central air bladder region 28 has an upper width, by example of sixty millimeters. The first central air bladder region 28 is tapered outward towards the second central air bladder region 30 to fit between an occupant's shoulder blades. Each of the central air bladder regions 28, 30, 32, 34 has a length of approximately one hundred millimeters, by example. The first central air bladder region 28 is provided by a single air bladder region for zone A. Zones B, C and D each are provided by a single air bladder that is divided into multiple regions.

A first pair of lateral air bladder regions 36, 38 extends from opposed sides of the second central air bladder region 30 for supporting the ribs in the thoracic region. Each of the first pair of lateral air bladder regions 36, 38 is separated from the second central air bladder region 30 by a partial divider or hem line 40 to permit fluid communication of compressed air between the second central air bladder region 30 and the first pair of lateral air bladder regions 36, 38 for uniform inflation and pressure distribution in the zone B. The first pair of lateral air bladder regions 36, 38 is angled relative to the second central air bladder region 30 to incline laterally so that each zone A, B, C, D fits adequately within the thoracic region. According to one embodiment, the offset angle of the first pair of lateral bladder regions 36, 38 is within a range of fifteen to forty-five degrees, such as thirty degrees for example when measured at an upper or lower seam of the lateral bladder region 36, 38. Each of the first pair of lateral air bladder regions 36, 38 has a tapered width from thirty-five millimeters for example, to fifty-two millimeters and may define an irregular quadrilateral shape, such as a trapezoid.

With continued reference to FIG. 4, a second pair of lateral air bladder regions 42, 44 extends from opposed sides of the third central air bladder region 32 at an angle similar to the first pair of lateral air bladder regions 36, 38 and a width expanding to approximately sixty-nine millimeters. FIG. 3 illustrates that the second pair of lateral air bladder regions 42, 44 are oriented and pivoted at an angle relative to each other about a longitudinal axis to provide a concave zone C when the seating surface 24 is deflected by the occupant sitting in the seat assembly 10 for supporting the ribs in the thoracic region. Zones B and D are similarly angled for concavity under deflected conditions. The angle of the offset of the second pair of lateral air bladder regions 42, 44 to the third central air bladder region 32 may be within a range of fifteen to forty-five degrees. When an occupant sits in the seat assembly 10, his/her weight presses rearward into the seat back 14 causing the foam and suspension system to deflect rearward to a degree representative of the force applied by the occupant's position and size. When this occurs, the side bladders 36, 38, 42, 44 described then position in a concave shape, wrapping the occupant in a support pneumatic system.

Referring again to FIG. 4 a third pair of lateral air bladder regions 46, 48 extend from opposed sides of the fourth central air bladder region 34 at the angles described above to a tapered width of approximately 104 millimeters.

The air bladder assembly 16 provides incremental concave and angled zones A, B, C, D to adjust and distribute air pressure for achieving support to a thoracic region that contributes to posture and wellness, and consequently comfort and safety of an occupant. The lateral air bladder regions 36, 38, 42, 44, 46, 48 provide a pair of wings that extend from the central column 28, 30, 32, 34 with individual longitudinal pressure adjustment.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat back;
   an air bladder assembly, oriented within a thoracic region of the seat back with a lateral width within the thoracic region, the air bladder assembly comprising air bladder regions with a support surface that is oriented rearward of a seat back contact surface and reclined relative to the seat back contact surface to provide adjustable support to the seat back contact surface, and wherein the air bladder assembly support surface is wedge-shaped so that during inflation the air bladder regions inflate in an upward and forward direction relative to the seat back;
   at least one central longitudinal air bladder region having a support surface;
   at least one pair of lateral air bladder regions extending from opposed sides of the at least one central longitudinal air bladder region, wherein the at least one pair of lateral air bladder regions are oriented at a non-zero angle to incline laterally and support the thoracic region of a seat occupant;
   wherein the at least one central longitudinal air bladder region comprises an upright column of central air bladder regions;
   wherein the upright column of central air bladder regions comprises:
      a first central air bladder region having a tapered width increasing in a longitudinal direction and sized to fit between an occupant's shoulder blades, and
      a second central air bladder region adjacent the first central air bladder region; and
   wherein the seat back is provided with a contact surface.

2. The seat assembly of claim 1 further comprising upper and lower seams of the at least one pair of lateral air bladder regions oriented at the non-zero lateral angle.

3. The seat assembly of claim 1 wherein the non-zero angle is further defined as an angle in a range of fifteen to forty-five degrees.

4. The seat assembly of claim 1 wherein the non-zero angle is further defined as thirty degrees.

5. The seat assembly of claim 1 wherein the at least one pair of lateral air bladder regions are also oriented at a second non-zero angle relative to the at least one central air bladder region support surface to incline forward.

6. The seat assembly of claim 5 wherein the second non-zero angle is further defined as an angle in a range of fifteen to forty-five degrees.

7. The seat assembly of claim 1 wherein each of the at least one pair of lateral air bladder regions has a support surface defined by an irregular quadrilateral shape.

8. The seat assembly of claim 7 wherein the irregular quadrilateral shape is further defined as a trapezoid.

9. The seat assembly of claim 1 wherein the increased width is further defined as greater than sixty millimeters.

10. The seat assembly of claim 1 wherein the at least one pair of lateral air bladder regions extend from opposed sides of the second central air bladder region;
    wherein the at least one pair of lateral air bladder regions is further defined as a first pair of air bladder regions;
    wherein the upright column of central air bladder regions further comprises a third central air bladder region adjacent the second central air bladder region and spaced apart from the first central air bladder region; and
    wherein the air bladder assembly further comprises a second pair of lateral air bladder regions extending from opposed sides of the third central air bladder region wherein the second pair of lateral air bladder regions are oriented at a non-zero angle relative to one another to support the thoracic region of the seat occupant.

11. The seat assembly of claim 1 further comprising:
    an inflation device in fluid communication with the air bladder assembly; and
    a controller in electrical communication with the inflation device to control selective inflation of the air bladder assembly.

12. An air bladder assembly comprising:
    a central region having a width of approximately sixty millimeters and a length of approximately four hundred millimeters; and
    a pair of wings extending from the central region, each wing having a tapered width expanding at approximately thirty degrees to an end that is at least one hundred millimeters in width to collectively support a thoracic region;
    wherein the pair of wings do not extend an entire length of the central region; and
    wherein the central region and the pair of wings further define a plurality of longitudinally separated compartments for individual adjustment.

13. The air bladder assembly of claim 12 further comprising upper seams and lower seams separating the plurality of longitudinally separated compartments;
    wherein the upper seams and the lower seams are oriented horizontally in the central region; and
    wherein the upper seams and the lower seams are angled at an outward incline in the pair of wings.

14. The air bladder assembly of claim 12 wherein the plurality of longitudinally separated compartments comprises:
    a first compartment defined by the central region only with a width;
    a second compartment defined by the central region and the pair of wings with an overall width greater than the first compartment width; and
    a third compartment defined by the central region and the pair of wings with an overall width greater than the second compartment width.

15. A seat assembly comprising a seat back and an air bladder assembly according to claim 12 oriented within a thoracic region of the seat back.

16. The seat assembly of claim 15 wherein the seat back is provided with a contact surface; and
    wherein the air bladder assembly is provided with a support surface that is reclined relative to the contact surface to provide support, and wedge-shaped so that during inflation the air bladder assembly inflates in an upward and forward direction relative to the seat back.

* * * * *